United States Patent [19]
Jansen et al.

[11] 3,938,305
[45] Feb. 17, 1976

[54] APPARATUS FOR SEALING CONTAINERS

[75] Inventors: Helmut Jansen; Klaus Vollmer, both of Viersen, Germany

[73] Assignee: Robert Bosch G.m.b.H., Stuttgart, Germany

[22] Filed: Feb. 18, 1975

[21] Appl. No.: 550,736

[30] Foreign Application Priority Data
Feb. 18, 1974  Germany............................ 2407637

[52] U.S. Cl. ...................... 53/300; 53/329; 53/373; 198/19
[51] Int. Cl.² ...................... B65B 7/28; B65B 51/14
[58] Field of Search ............ 53/329, 373, 300, 301, 53/302, 303, 304, 272, 282; 198/19, 25, 28

[56] References Cited
UNITED STATES PATENTS

| | | | |
|---|---|---|---|
| 3,372,081 | 3/1968 | Hurschman | 53/300 UX |
| 3,452,513 | 7/1969 | Owens, Jr. | 53/373 X |
| 3,453,803 | 7/1969 | Mojonnier | 53/373 X |
| 3,777,454 | 12/1973 | Van Manen | 53/373 |

*Primary Examiner*—Travis S. McGehee
*Assistant Examiner*—Horace M. Culver
*Attorney, Agent, or Firm*—Edwin E. Greigg

[57] ABSTRACT

An apparatus for sealing packaging containers formed at least in part of a bondable material. The apparatus includes a first bonding unit and a second bonding unit which are fixedly disposed with mutual spacing on an endless conveyor. A device is provided for removing a covered container from the first bonding unit, after the container is provided with a first bonded seam therein by application of heat and pressure, and transferring it to the second bonding unit. This removing and transferring device is disposed on the common path of rotation of the two bonding units. The second bonding unit effects the application of a second bonded seam to the covered container.

7 Claims, 3 Drawing Figures

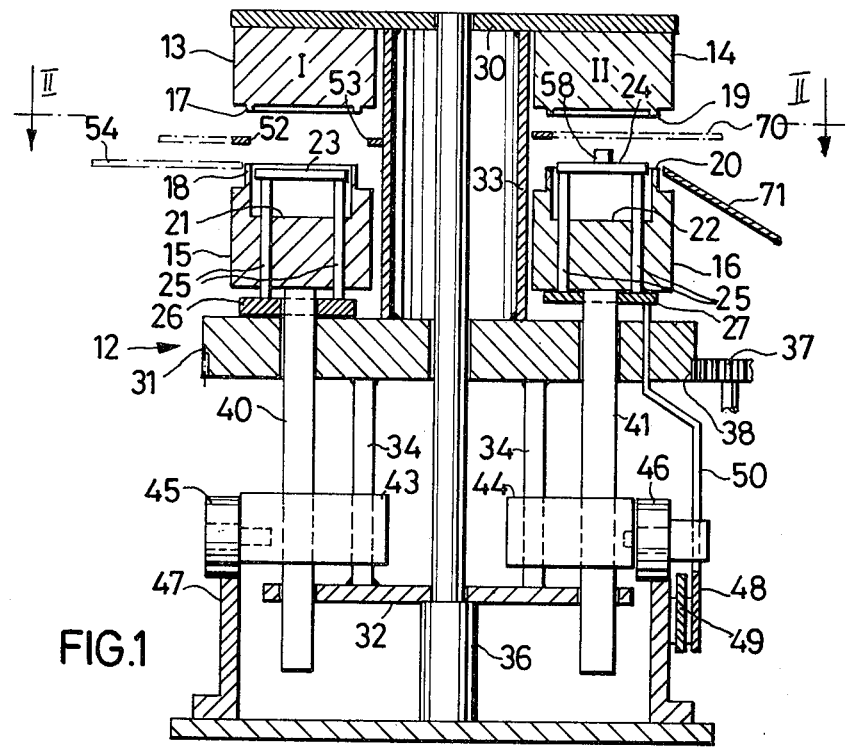
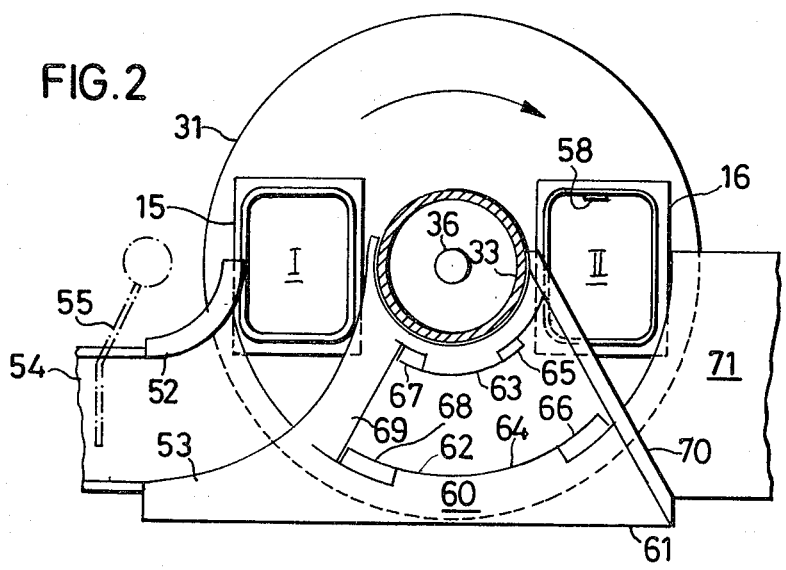

APPARATUS FOR SEALING CONTAINERS

BACKGROUND OF THE INVENTION

The present invention relates to an apparatus for sealing packaging containers formed at least partially of a bondable material, the sealing being effected under the action of pressure and heat. The present invention relates, more particularly, to such an apparatus having a first bonding unit and a second bonding unit.

Many spoilable foodstuffs are nowadays packed in containers which are made at least partially of a bondable plastic material and which are sealed by means of a bonded seam. As the reliability of the sealed tightness of the closing seam is considerably increased if it were finished with a double bond, it is the current practice to provide a first bonded seam with a first bonding tool and, after the first seam has hardened, to apply a second bonding seam with a second bonding tool to effect closure of the container. The two bonded seams may cover each other, may partially cover each other or they may be disposed parallel to each other with a slight distance or no distance therebetweeen. The two bonded seams may be of identical width or may be selected such that the first bonded seam is wider than the second bonded seam.

SUMMARY OF THE INVENTION

It is an object of the present invention to provide an apparatus for sealing packaging containers which is simple and yet effective to apply a double bond.

It is another object of the present invention to provide an apparatus for sealing packaging containers, formed at least partially of bondable material, with a double bond.

The foregoing objects, as well as others which are to become apparent from the text below, are achieved according to the present invention in an apparatus for sealing containers by providing first and second bonding units rigidly disposed, with mutual spacing, on an endless rotating conveyor. A device for removing a container closed by means of the first bonded seam from the operating region of the first bonding unit and for transferring this container to the operating region of the second bonding unit is disposed on the common circulation path of the two bonding units.

In a preferred embodiment of the present invention, in which a lid may be bonded to a projecting flange of a container, the removing and transferring device has stationary guides onto which a container with its flange is pushed and released by the first bonding unit after the application of the first bonded seam and from which the container is again pushed and conveyed to the second bonding unit for the application of the second bonded seam.

Other objects, features and advantages of the present invention will be made apparent in the following detailed description of a preferred embodiment thereof which is provided with reference to the accompanying drawing.

BRIEF DESCRIPTION OF THE DRAWINGS

FIG. 1 is a cross-sectional view of an apparatus for bonding lids on containers according to an exemplary embodiment of the present invention;

FIG. 2 is a plan view of the apparatus shown in FIG. 1, the section having been taken along the plane defined by section line II—II of FIG. 1.

DESCRIPTION OF THE PREFERRED EMBODIMENT

Figure 3:
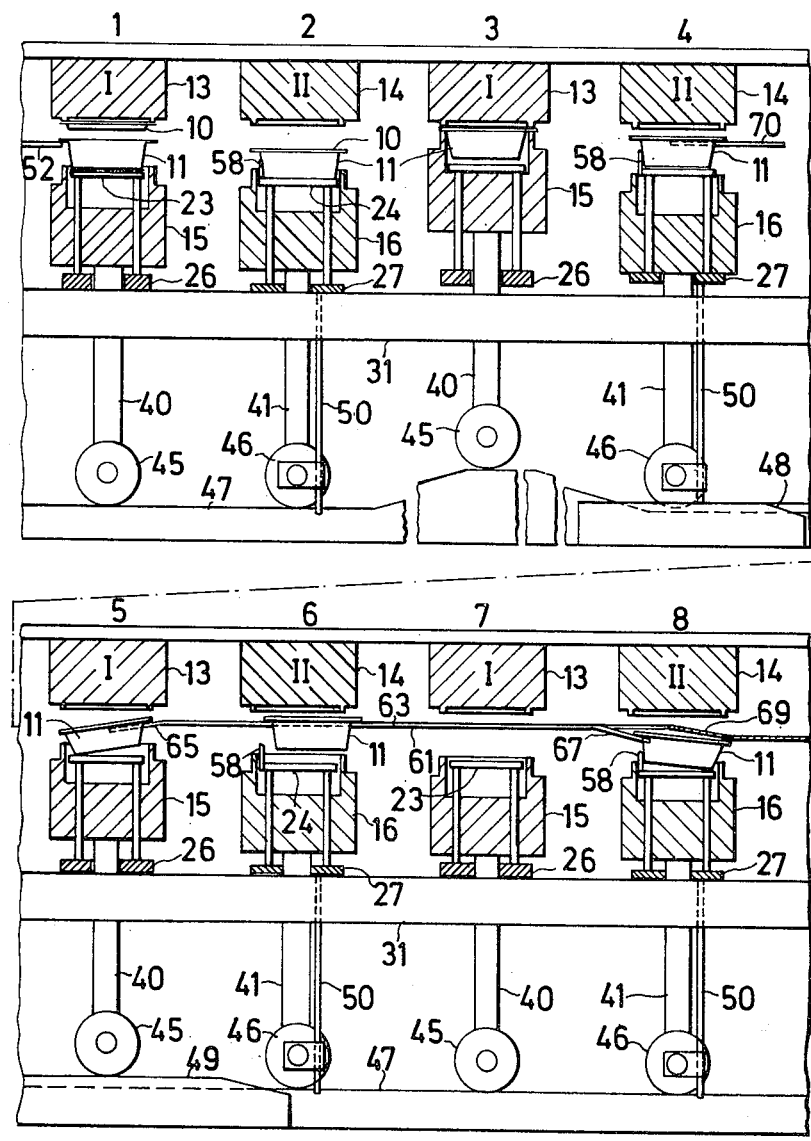
FIG. 3 is a developed view of the apparatus shown in FIGS. 1 and 2 in which the individual bonding units are represented in different operating positions.

The illustrative embodiment of a sealing apparatus which is illustrated in the drawing is designed to bond a lid 10 on the projecting flange of a full container 11. The lid 10 and the container 11 are made of a bondable packing material, for example, a composite plastic-aluminum material.

The embodiment of the sealing apparatus, shown in the drawing, includes two bonding units I and II on a continuously rotating drum 12 for bonding the lid 10 to the flange of the container 11. The two bonding units I and II each are provided with an upper sheeted bonding head 13, 14 and a lower bonding die 15, 16 which is moved up and down. The bonding heads 13, 14 and the bonding dies 15, 16 are provided on their respective sides facing towards each other with overlapping framework ribs 17–20, the shape of which corresponds to the circumference of the lid 10 and the flange of the container 11. The ribs 17, 18 of the bonding unit I are substantially 3 mm in thickness and the ribs 19, 20 of the second bonding unit II are substantially 2 mm in thickness. Inside of the ribs 18, 20 the bonding dies 15, 16 are provided with a recess 21, 22 for receiving a container 11. In each recess 21, 22 is a base plate 23, 24 which is connected to a ring 26, 27 via two displaceable pins 25 passing through the respective bonding dies 15, 16.

The drum 12 which supports the two bonding units I and II includes a cover plate 30, a table 31, and a lower plate 32. The cover plate 30 is rigidly connected to the table 31 by a pipe 33 and the lower plate 32 is connected to the table 31 via pins 34. The drum 12 is disposed on a vertical column 36 and is rotatably mounted thereon.

The drum 12 is continuously driven via a cog wheel 37 which engages with a gear rim 38 on the table 31.

The bonding heads 13, 14 of the two bonding units I and II are secured diametrically opposite to each other on the underside of the cover plate 30. The two bonding dies 15, 16 are respectively supported on rods 40, 41 which are vertically displaceable in the table 31 and in the lower plate 32 so that the bonding dies 15, 16 can be moved against their respective bonding heads 13, 14 for the bonding operation. Blocks 43, 44 are respectively secured to the rods 40, 41 for this purpose. The blocks 43, 44 are guided by the pins 34 and their respective rollers 45, 46 which rest on a stationary support 47 on a profiled surface thereon. As the drum 12 rotates, the bonding dies 15, 16 are raised against the bonding heads 13, 14 and are passed against the same and then lowered in correspondence with the raised portions of the profiled surface of the support 47, as best seen in FIG. 3.

The length of the pins 25 which connect the base plate 23 of the first bonding unit I with the ring 26 is such that in one position, in which the ring 26 rests on the table and the bonding die 15 is disposed in a lower position, the upper side of the base plate 23 is disposed a short distance below the plane of the upper side of the bonding rib 18. This embodiment makes it easier to load and unload the first bonding unit I.

In the case of the second bonding unit II, the length of the pins 25 is such that in the position in which the ring 27 rests on the table 31 and the bonding die 16 is located in a lower position, the upper side of the base plate is from about 10 to about 20 mm below the plane of the upper side of the bonding rib 20. By means of a rod 50, which is secured to the ring 27, the base plate 24 can be retained in a position in which its upper side is above the plane of the rib 20. This position is controlled by a cam member 48 which, in the unloading region of the closed container 11, is secured to the support 47 radially outside of the same, as seen best in FIG. 1.

Stationary guides 52, 53, which extend over one-quarter of the circumference from a container supplying device 54 into the path of rotation of the bonding units, are provided for introducing the containers 11 to be closed into the first bonding unit I. The space between the guides 52, 53 is slightly larger than the width of the containers 11. A rotating arm 55 pushes an oncoming container 11 between the guides 52, 53, the flange of this container 11 resting on the guides 52, 53 as a cover 10 is supplied to the rotating first bonding unit I. At the end of the guides 52, 53 the supplied container 11 is deposited on the base plate 23 of the first bonding unit I and is displaced with the same in this position. A lid 10 which is to be bonded to the container 11 can rest on the container 11 and be conveyed with the same. However, it can also be moved into the path of rotation of the two bonding units I and II using rails and a pivot arm. On reaching the path of rotation of the two bonding units I and II, the lid 11 is then drawn by under pressure against the underside of the bonding head 13 (FIG. 3, position 1).

After this container 11 and the supplied lid 10 have been moved into the first bonding unit I, the unit I is guided by the drum 12 over a region of the profiled support 47 which first rises, remains the same for a stretch of about 60° and then slopes down again (FIG. 3, position 3). On passing through this region, the bonding die 15 is raised by the roller 45 on the rod 40 whereby the particular container 11 which is being conveyed therewith is moved into the recess 21 and its flange rests on the rib 18. The bonding die 15 finally presses the flange of this container 11 against the lid 10, which rests against the rib 17 of the bonding head 13. After a specific period of time, during which the bonding head 13 and the bonding die 15 of bonding unit I exert pressure and heat on the seam region, the bonding die 15 is again lowered. In the course thereof the ring 26 rests on the table 31 so that the container 11 again comes to rest on the base plate 23. The bonding die 15 is at first not returned to its lowest position but it remains in an intermediate position for releasing the particular container 11 from within the first bonding unit I. In this intermediate position the upper side of its rib 18 is approximately 10 to 20 mm above the upper side of the base plate 23 such that the rib 18 acts as a pick-up for the particular container 11 (FIG. 3, position 5). The intermediate position of the bonding die is determined by a curved member 49 which is attached at the periphery of the profiled support 47 radially outside the same and which extends over an angle of substantially 100°, following after the bonding region. The ribs of the roller 45 and its arrangement on the rods 40 are such that it is displaced both on the profiled surface of the support 47 and the curved member 49.

A transfer device 60, which extends over an angle of substantially 90°, is disposed in the direction of rotation of the drum 12 in front of the container supplying device 54 for the purposes of transferring the particular container 11 which has been filled and provided with an applied first bonded seam to the second bonding unit II where a second bonded seam can be applied. The transfer device 60 includes a plate 61 with an arcuate slit 62 in the path of rotation of the two bonding units I and II for transferring the containers 11. The width of the slit 62 is somewhat larger than the width of the individual containers 11, but smaller than the diameter of the flange of the containers 11 at the relevant point such that the limiting portions of the slit 62 constitute guides 63, 64 for the sidewalls of the containers 11 and a support for their flange. The plate 61 is disposed in an elevated position in the path of rotation of the two bonding units I and II such that when the containers 11 rest with their respective flanges on the guides 63, 64 the bonding heads 13, 14 and the lowered bonding dies 15, 16 can be readily moved over or under the containers (FIG. 3, positions 6 and 7). At the beginning of the guides 63, 64, the plate 61 have respectively upending positions 65, 66, and at the end respective descending portions 67, 68. A descending portion 69 is connected at the end of the slit 62 of the plate 61 at the descending portions 67, 68 of the guides 63, 64.

When a particular container 11 being displaced reaches the first bonding unit I in the region of the plate 61 with the guides 63, 64, its elevation is such that its flange is disposed in a plane above the ascending portions 65, 66 of the guides 63, 64. When such a container 11 passes through the slit 62 the two lateral parts of its flange first move on to the ascending portions 65, 66 of the guides 63, 64 and then on to the middle portion, while the container 11, considered in the direction of rotation of the drum 12, is pushed by the rear parts of the rib 18 of the bonding die 15. After this container 11 has been pushed onto the central, horizontal part of the guides 63, 64 the bonding die 15 is lowered at the end of the curved member 49 into the lower position such that the rib 18 loses contact with the particular container 11 being pushed. This container 11 is now kept waiting in the slit 62 for a short period of time until it is moved forward by the second bonding unit II. In the meantime, the empty, first bonding unit I moves forward in the above-described loading position.

The bonding die 16 of the second bonding unit II which follows one half rotation of the drum 12 after the first bonding unit I is disposed in the region of the transfer device 60 in its lower position, which is determined by the lower part of the profiled support 47. The upper side of the rib 20 of the bonding die 16 is then disposed in a plane below the base of the particular container 11 waiting in the slit 62. The ring 27, supporting the base plate 24 via the rods 25, is disposed on the table 31 such that the base plate 24 is also in its lower position. The base plate 24 is provided at its rear end, in the direction of rotation, with an engaging finger 58 which projects substantially 20 mm over the upper side of the base plate 24. As the drum 12 rotates, this engaging finger 58 strikes the rear part of the particular container 11 disposed in its waiting position in the slit 62 and then pushes the same in the direction of the descending portions 67, 68 and 69 of the guides 63, 64 (FIG. 3, positions 6 and 8). The container 11 is lowered at the end of the guides 63, 64 via their descending portions 67, 68 such that it finally rests on the base plate 24 before the second bonding unit II passes through the loading region for the first bonding unit I. The base plate 24 is then in a lower position, the elevation of which, in respect of the elevation of the guides 52, 53, is such that the particular container 11 being conveyed is moved readily below these guides 52, 53.

In the succeeding region, in which the profiled support 47 is elevated, the bonding die 16 of the second bonding unit II is also raised and is again lowered as was described above in relation to the first bonding unit I. In the course thereof, a second bonded seam is applied to the container 11. the second seam covers the first seam, and it is narrower than the first seam. The fully covered container 11 is now removed by a delivery rail 70 from the path of rotation of the two bonding units I and II. Considered in the direction of rotation of the drum 12, the delivery rail 70 is disposed at the beginning of the plate 61 and crosses the path of the two bonding units I and II at an angle of substantially 60°. The elevation of the rail 70 is such that a particular container 11 being conveyed on the base plate 23 in the first bonding unit I moves freely below this rail 70. Its position is higher than that of the ascending portions 65, 66 of the guides 63, 64 of the plate 61.

To push any of the containers 11 out of the second bonding unit II, the bonding die 16 of this unit is moved into its lower position. The base plate 24 which is simultaneously raised from the base of the recess 22 does not yet return to its lower position but is moved into an intermediate position in the region of the rail 70. This is achieved by the cam member 48 on the profiled support 47. When the bonding die 16 and the base plate 24 are lowered the rod 50 comes into contact with the upper side of the cam member 48 such that the rod 50 temporarily slides on this cam member 48 as the drum 12 rotates. When the base plate 24 is in its intermediate position, the elevation of the container resting thereon is such that its flange is disposed in a plane a short distance above the upper side of the rail 70 on the part of the side wall of the particular container 11 adjacent to the flange and can move against the rail 70. Thus, as the second bonding unit II rotates, the particular container 11 being conveyed is moved against the rail 70 and, while it is pushed by the engaging finger 58 of the base plate 24, it is moved by the rail 70 out of the path of travel of the two bonding units I and II and is pushed onto an inclined slide 71 into a delivery station.

The above-described embodiment includes only two bonding units, the two bonding units I and II, to effect a sealing with two bonded seams on containers. To achieve a higher output an apparatus according to the present invention can also be provided with a plurality of pairs of bonding units in each of which a bonding unit of the first type for providing a first bonding seam and a bonding unit of the second type for providing a second bonded seam are disposed alternately on the drum.

When the invention is in this form the containers to be sealed are displaced over a distance of not quite two circles of rotation, the same means controlling all of the bonding units, regardless of type, for producing both the first and the second bonded seams. Thus, the apparatus according to the present invention is simple, and the diameter of the drum can be kept small.

It is also within the scope of the present invention for an apparatus according to the present invention to be designed in such a way that the containers to be provided with bonded seams are only displaced over a distance of not quite one circle of rotation. In this case, separate means are required to control the first bonding units I for providing the first bonded seam and to control the second bonding unit II for applying the second bonded seam. In this case, the transfer device for transferring the containers provided with the first bonded seam from a first bonding unit I to a second bonding unit Ii is disposed between the section where the first bonded seam is applied on the section where the second bonded seam is applied.

It is to be appreciated that the foregoing description and accompanying figures of drawing concern an embodiment of the present invention provided by way of example, not by way of limitation. Numerous other embodiments and variants are possible within the spirit and scope of the present invention, its scope being defined in the appended claims.

What is claimed is:

1. In an apparatus for sealing packing containers consisting at least partially of a bondable material under the action of pressure and heat using a first and a second bonding unit, the improvement comprising an endless rotatable conveyor, means for rigidly disposing said first and second bonding units with mutual spacing on said endless rotatable conveyor, and means disposed on a common path of rotation of said first and second bonding units for removing a container sealed with a first bonded seam from the operating zone of said first bonding unit and for transferring this container to the operating zone of said second bonding unit.

2. An apparatus as claimed in claim 1, which is particularly useful in sealing containers having a projecting flange, wherein said means for removing includes stationary guides onto which a container with its flange may be pushed and released after the application of the first bonded seam by said first bonding unit and from which it may be pushed and displaced for the application of the second bonded seam by said second bonding unit.

3. An apparatus as claimed in claim 2, wherein said guides include ascending and descending portions at their ends.

4. An apparatus as claimed in claim 3, wherein said guides are parts of a plate and limit an arched slit therein.

5. An apparatus as claimed in claim 1 including guides, and wherein said first and second bonding units include respective engaging members which push containers onto said guides and off the same.

6. An apparatus as claimed in claim 5, wherein the elevation of said guides is such that in their non-operational position upper head portions of said first and second bonding units may move over a container which has been pushed onto said guides without contacting the same and only that said engaging member of said second bonding unit for applying the second bonded seam strikes against a container in its waiting position and displaces the same.

7. An apparatus as claimed in claim 6, wherein the elevational position of that said engaging member of said second bonding unit is controllable.

\* \* \* \* \*